(12) United States Patent
Lanterman et al.

(10) Patent No.: US 7,472,897 B2
(45) Date of Patent: *Jan. 6, 2009

(54) CUSHION AND CUSHION CYLINDER FOR RAM OR BOLSTER OF A PRESS

(75) Inventors: Harold L. Lanterman, Stow, OH (US); Steven J. Reilly, Westlake, OH (US); Terry L. Gang, Jr., Uniontown, OH (US); Henry J. Kelm, Litchfield, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,079

(22) Filed: Jul. 27, 2006

(65) Prior Publication Data

US 2006/0284353 A1  Dec. 21, 2006

Related U.S. Application Data

(63) Continuation of application No. 10/893,475, filed on Jul. 16, 2004, now Pat. No. 7,083,164.

(60) Provisional application No. 60/488,694, filed on Jul. 18, 2003.

(51) Int. Cl.
  *F16F 5/00* (2006.01)
(52) U.S. Cl. .................................... 267/119; 72/453.13
(58) Field of Classification Search ................ 267/119, 267/130, 124, 120, 322.16, 322.17, 322.18; 188/322.16, 322.17, 322.18; 72/453.13, 72/453.14, 453.01
  See application file for complete search history.

(56) References Cited

U.S. PATENT DOCUMENTS

| | | | |
|---|---|---|---|
| 4,257,254 A | 3/1981 | Adamus et al. | |
| 4,342,448 A | 8/1982 | Wallis | |
| 4,529,181 A | 7/1985 | Wallis | |
| 4,583,722 A | 4/1986 | Wallis | |
| 4,765,227 A | 8/1988 | Balazs et al. | |
| 5,007,276 A | 4/1991 | Kadis et al. | |
| 5,265,852 A * | 11/1993 | Taylor | ........................ 267/119 |
| 5,314,172 A | 5/1994 | Wallis | |
| 5,339,932 A | 8/1994 | Lanterman | |
| 5,996,981 A | 12/1999 | Dilling | |

(Continued)

*Primary Examiner*—Robert A. Siconolfi
*Assistant Examiner*—Mahbubur Rashid
(74) *Attorney, Agent, or Firm*—Fay Sharpe LLP

(57) ABSTRACT

A high-pressure, inert gas cushion assembly for the ram or bolster of a metal stamping press includes a manifold having fluid-flow passages defined therein, along with a plurality of cylinder mounting locations each in communication with at least one of the fluid-flow passages. A plurality of cushion cylinders are located respectively in the cylinder mounting locations. Each cylinder includes a body having an inner wall that defines a bore of diameter D. A piston is located in the bore and includes opposite inner and outer faces, wherein the outer face is oriented outwardly relative to the bore and manifold. A fluid seal is supported on the piston and is slidably engaged with the wall defining the bore. One or more bearings are supported on the piston and slidably engaged with the inner wall that defines the bore. The bearing(s) support the piston slidably in the bore for reciprocal sliding movement between extended and retracted positions. The bearing(s) define a bearing-length L that is less than or equal to 40% of said bore diameter D.

20 Claims, 12 Drawing Sheets

U.S. PATENT DOCUMENTS 6,022,004 A    2/2000   Kelm et al.
6,145,819 A  * 11/2000  Geske et al. ................ 267/119
6,322,059 B1   11/2001  Kelm et al.
6,749,185 B1   6/2004   Reilly et al.
6,796,159 B2   9/2004   Kelm et al.

* cited by examiner

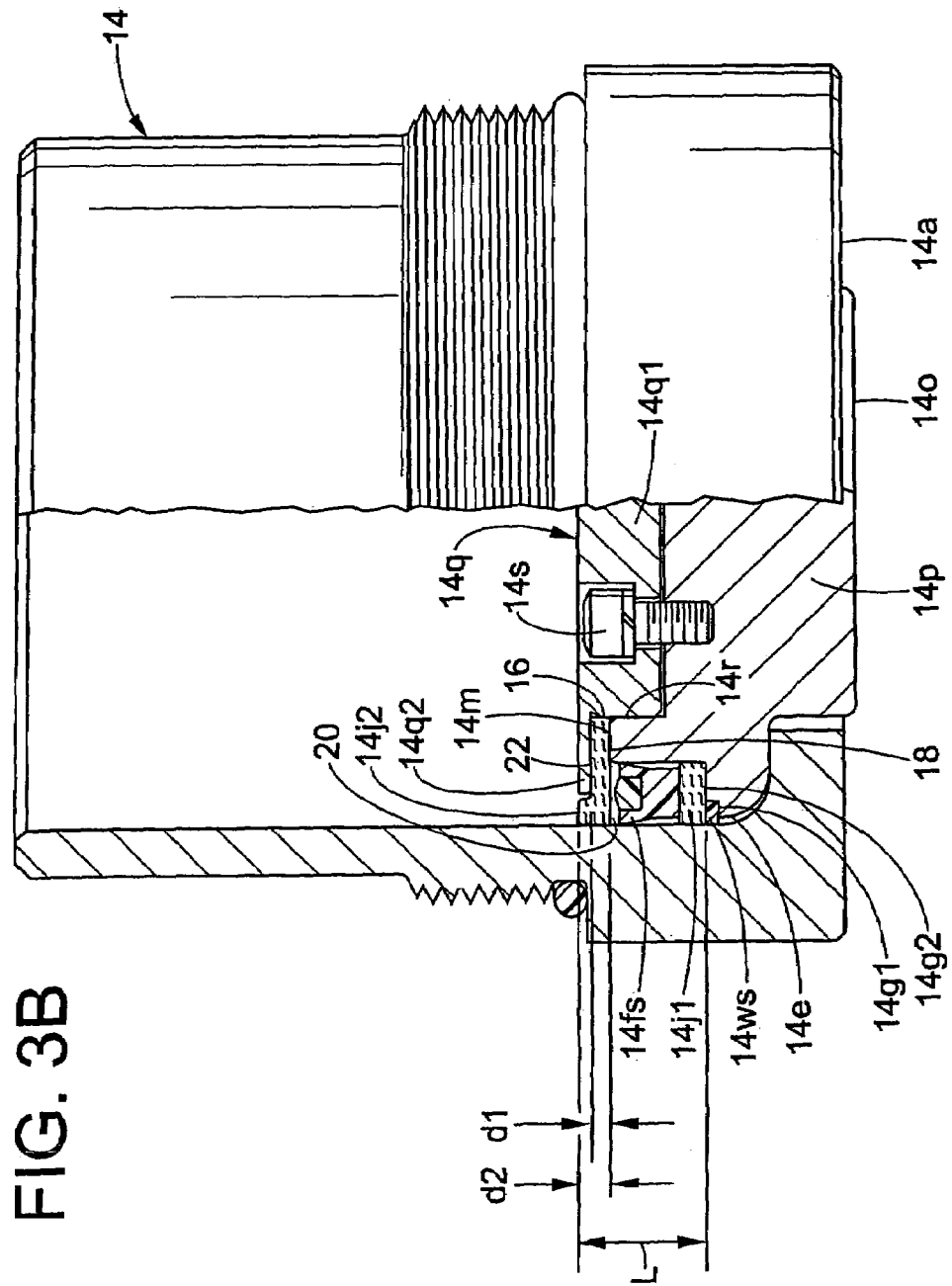

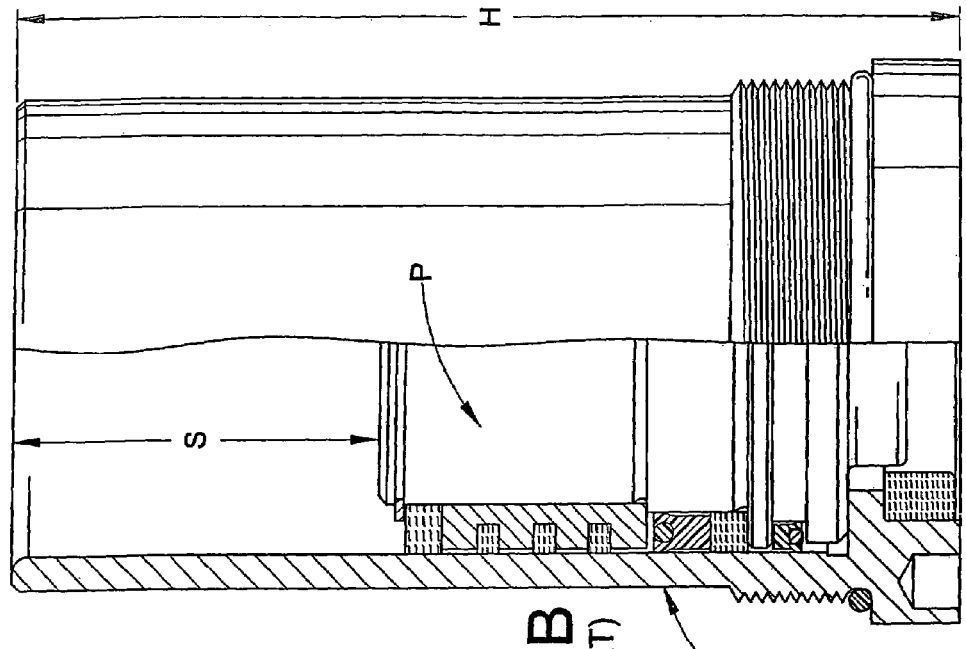
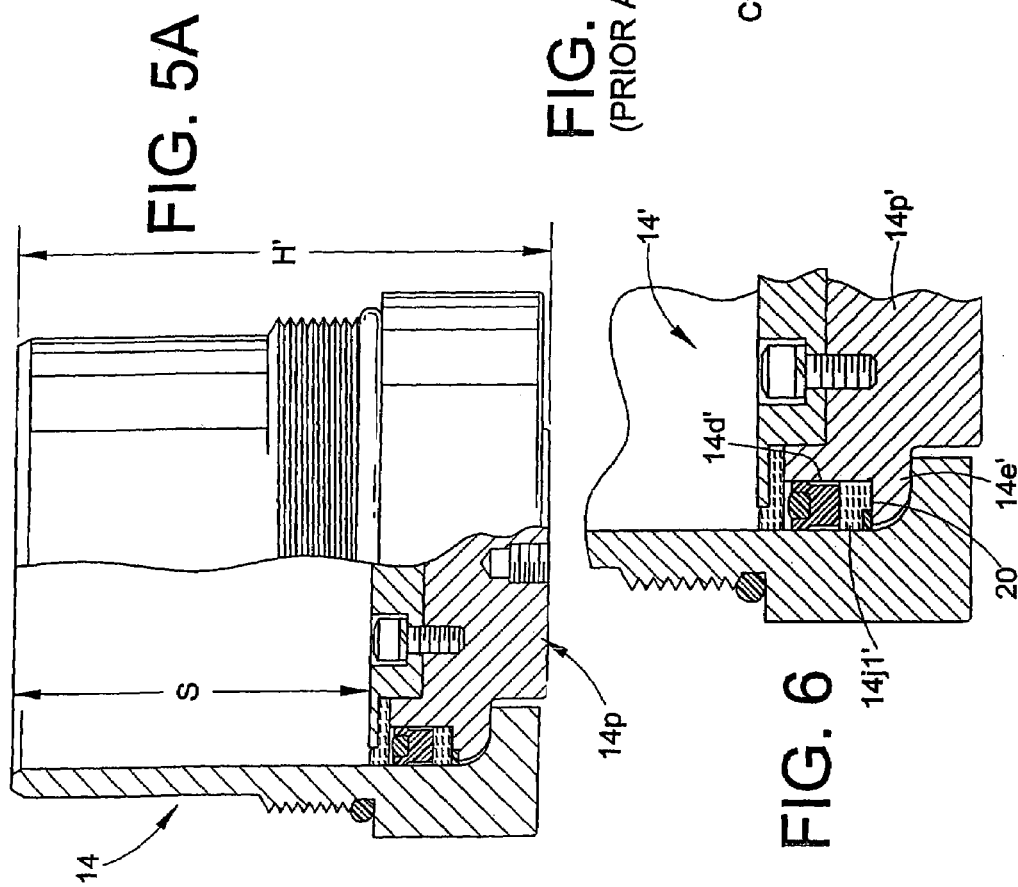

CUSHION AND CUSHION CYLINDER FOR RAM OR BOLSTER OF A PRESS

CROSS-REFERENCE TO RELATED APPLICATION

This application is a continuation of U.S. application Ser. No. 10/893,475, filed Jul. 16, 2004, now U.S. Pat. No. 7,083,164 which application claims priority from and benefit of the filing date of U.S. provisional application Ser. No. 60/488,694, filed Jul. 18, 2003, and the disclosures of both such applications are hereby incorporated by reference.

BACKGROUND OF THE INVENTION

In metal stamping operations and apparatus, it is well-known to utilize a manifold cushion assembly having multiple separate cushion cylinders on the ram and/or bolster of a press to allow for use of multiple different dies without providing a dedicated manifold cushion assembly for each die. As shown in FIGS. 1 and 1A, the cushion apparatus comprises a plate-like manifold member M defined from steel or the like including gas-flow passages G drilled or otherwise formed therein. A plurality of cylinders C are operatively secured to the manifold M and are pressurized by nitrogen or other inert gas N held under high-pressure within the gas-flow passages G of the manifold. As used herein the term high-pressure is intended to mean a pressure of at least 300 pounds per square inch (psi) or at least 2068.5 kilopascal (kPa). As shown in FIG. 1A, each cylinder C comprises a metal body B including an inner wall BW that defines a bore BR. A metal piston P is slidably mounted within the bore BR and is adapted to reciprocate slidably in the bore axially a stroke distance S. The nitrogen or other inert gas contained in the passages G under pressure flows into the cylinder bore BR (see arrows N) and biases the piston P of each cylinder C to a normal, extended position as shown in FIG. 1, so that the piston P abuts a flange FB located at an outer end of the body B.

In use, a die is fitted over the cushion assembly (the cushion assembly comprises the manifold M and a plurality of cylinders C) and actuation pins of the die are aligned with the pistons P of at least some of the cylinders C. When the die portions are mated in the press to perform work, a die actuation pin engages an outer surface O of a piston P and strokes the piston axially inward for at least part of the stroke distance S against the pressure of the gas as indicated by the arrow A. As such, the cylinders C cushion the mating engagement of die portions in a press. Parting of the die portions is also facilitated owing to the biasing force exerted on the piston P by the pressurized gas contained in the manifold M.

With continuing reference to FIG. 1A, the body B of cylinder C is received in a mounting location bore MB of the manifold and is typically connected to the manifold M via mating threads T formed on the body and manifold or otherwise. An O-ring seal OS closely surrounds the cylinder body and sealingly engages the manifold M to prevent escape of gas between the body B and manifold M. The outer end of the body B includes a sleeve bushing E fitted thereon that closely received and surrounds the actuation pin of a die and guides same into engagement with the piston P.

The piston P is slidably supported in the bore BR by first and second axially spaced-apart annular bearings BE1,BE2. The first bearing BE1 is seated against an inward side of a flange FP of the piston. An annular seal member SL1 is located outwardly of the first bearing BE1 on the opposite side of the flange FP relative to first bearing BE1. The seal SL1 is seated against the piston P in a groove G1 and slidably engages the inner wall BW defining cylinder bore BR to prevent entry of metal particles or other contaminants therepast into bore BR. A second seal SL2 is located inwardly of the first bearing BE1 and is seated against first bearing BE1. The seal SL2 encircles piston P and slidably abuts the inner wall BW defining bore BR to prevent escape of gas N from passages G between piston P and body B in bore BR.

An annular spacer or carrier member SP defined from a metal such as aluminum or a polymeric material supports one or more annular wiper members SPW that slidably engage the inner wall BW defining bore BR. The wiper members SPW can be provided by foam members impregnated with oil so as to clean and lubricate inner wall BW when piston P reciprocates in bore BR. The second bearing BE2 axially abuts the inner end of spacer/carrier SP and is retained on piston P via snap-ring SN or the like.

The bearings BE1,BE2 are typically defined from a phenolic resin or the like. The seals SL1,SL2 are conventional polymeric seals and are typically U-cup seals or the like.

As noted, the bearings BE1,BE2 slidably support the piston P in the bore BR. As such, the bearings BE1,BE2 define inclusively therebetween an axial bearing-length L. The bearing-length L is the maximum axial distance between the outermost bearing (in this case BE1) and the innermost bearing (in this case BE2). In the case where only a single bearing member is used, the bearing-length L would correspond to the axial length of the single bearing member. The bore BR defines a diameter D. Heretofore, cylinders C for high-pressure inert gas cushion assemblies of the type described above as used for metal stamping have typically been manufactured with a ratio of bearing-length L to bore diameter D, L:D of about 1:1, i.e., in conventional cylinders C for high-pressure inert gas cushion assemblies, the bearing-length L has typically been at least nearly equal to or greater than the bore diameter D. Known cylinders of this type have not been provided with a L:D ratio of significantly less than 1:1, i.e., the dimension L has always been nearly equal to or greater than the dimension D. This has been found to be required with cylinders for high-pressure cushion assemblies, such as the cylinder C illustrated herein, to prevent jamming of the piston P in the bore BR or leakage of the high-pressure inert gas when the piston P is actuated under less than perfectly aligned conditions as are commonly encountered in use and which can cause tipping of the piston relative to the axis on which the piston P reciprocates. This can occur, e.g., when a metal chip becomes trapped between the die actuation pin and the piston P or due to misalignment. It should be noted that, unlike low-pressure cushion system that are continuously or periodically connected to a source of compressed air or "shop air," the high-pressure inert gas cushion assemblies of the type just described are charged with the pressurized inert gas only periodically and must function for a very large number of cycles without leakage of the biasing gas.

Those of ordinary skill in the art will recognize that for a given required stroke distance S, maintaining an L:D ratio of about 1:1 or greater requires the overall height H of the cylinder C to be increased to accommodate the required length L of the piston P. In certain applications, however, it has been deemed desirable to reduce the overall height of a cylinder C while maintaining a constant stroke distance S. For example, in certain applications, it has been deemed desirable to minimize the height H of the cylinder so that the height of the manifold M and overall cushion assembly can be correspondingly reduced, thereby increasing the press-open space available for dies.

SUMMARY

In accordance with one aspect of the development, a cushion for the ram or bolster of a metal stamping press includes a manifold comprising fluid-flow passages and a plurality of cylinder mounting locations each in communication with at least one of the fluid-flow passages. A plurality of cushion cylinders are located respectively in the plurality of cylinder mounting locations. Each cushion cylinder comprises: a body comprising an inner wall that defines a bore having a diameter D; a piston located in the bore and comprising opposite inner and outer faces, wherein the outer face is oriented outwardly relative to the bore and the manifold; a fluid seal supported on said piston and slidably engaged with the inner wall defining said bore; first and second axially spaced-apart bearings supported on the piston and slidably engaged with the inner wall defining the bore, wherein the first and second bearings cooperate to support the piston slidably in the bore for reciprocal sliding movement between an extended position, where the piston is located adjacent an outer end of the cylinder body, and a retracted position, where the piston is moved axially into the bore away from the outer end of the cylinder body. The bearings define inclusively therebetween a bearing-length L that is less than or equal to 40% of the bore diameter D.

In accordance with another aspect of the development, a cushion cylinder for a multiple cylinder, high-pressure cushion manifold comprises a body having an inner wall that defines a bore having a diameter D. A piston is located in the bore and comprises opposite inner and outer faces, wherein the outer face is oriented outwardly relative to the bore and said manifold. A fluid seal is supported on the piston and is slidably engaged with the inner wall defining the bore. First and second axially spaced-apart bearings are supported on the piston and are slidably engaged with the inner wall defining the bore. The first and second bearing cooperate to support the piston slidably in the bore for reciprocal sliding movement between an extended position, where the piston is located adjacent an outer end of the cylinder body, and a retracted position, where the piston is moved axially into the bore away from the outer end of the cylinder body. The bearings define inclusively therebetween a bearing-length L that is less than or equal to 40% of the bore diameter D.

In accordance with a further aspect of the development, a cushion for the ram or bolster of a metal stamping press includes a manifold comprising fluid-flow passages and a plurality of cylinder mounting locations each in communication with at least one of the fluid-flow passages. A plurality of cushion cylinders are located respectively in the plurality of cylinder mounting locations. Each cushion cylinder comprises: a body comprising an inner wall that defines a bore having a diameter D; a piston located in the bore and comprising opposite inner and outer faces, wherein the outer face is oriented outwardly relative to the bore and the manifold; a fluid seal supported on the piston and slidably engaged with the inner wall defining the bore; and at least one bearing supported on the piston and slidably engaged with the inner wall defining the bore and supporting the piston slidably in the bore for reciprocal sliding movement between an extended position, where the piston is located adjacent an outer end of the cylinder body, and a retracted position, where the piston is moved axially into the bore away from the outer end of the cylinder body. The at least one bearing defines a bearing-length L that is less than or equal to 40% of the bore diameter D.

In accordance with another aspect of the present development, a cushion cylinder for a multiple cylinder, high-pressure cushion manifold comprises: a body including an inner wall that defines a bore having a diameter D; a piston located in the bore and comprising opposite inner and outer faces, wherein the outer face is oriented outwardly relative to the bore and manifold; a fluid seal supported on the piston and slidably engaged with the inner wall defining the bore; and at least one bearing supported on the piston and slidably engaged with the inner wall defining said bore and supporting the piston slidably in the bore for reciprocal sliding movement between an extended position, where the piston is located adjacent an outer end of the cylinder body, and a retracted position, where the piston is moved axially into the bore away from the outer end of the cylinder body. The bearing(s) define(s) a bearing-length L that is less than or equal to 40% of the bore diameter D.

BRIEF DESCRIPTION OF DRAWINGS

The development comprises various components and arrangements of components, preferred embodiments of which are shown in the drawings wherein:

FIG. 3B is similar to FIG. 3A but shows a cushion cylinder by itself;

FIGS. 5A and 5B respectively show a cushion cylinder formed in accordance with the present development and a conventional cushion cylinder, with each cushion cylinder shown partially in section;

FIG. 6 is a partial sectional view of a cushion cylinder formed in, accordance with an alternative embodiment of the present development;

DETAILED DESCRIPTION OF PREFERRED EMBODIMENTS

Figure 1:
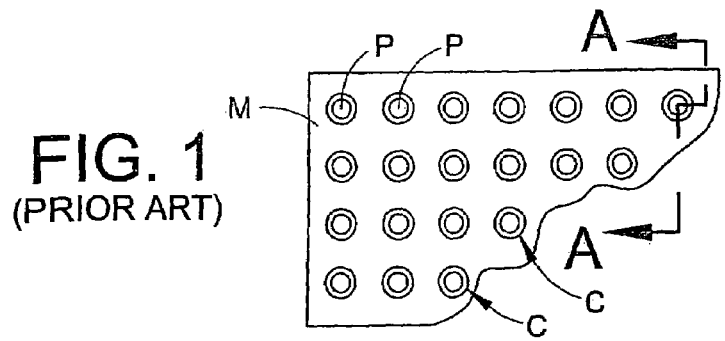
FIG. 1 is a partial plan view of a conventional high-pressure inert gas cushion assembly for the ram or bolster of a metal press.
Figure 1A:
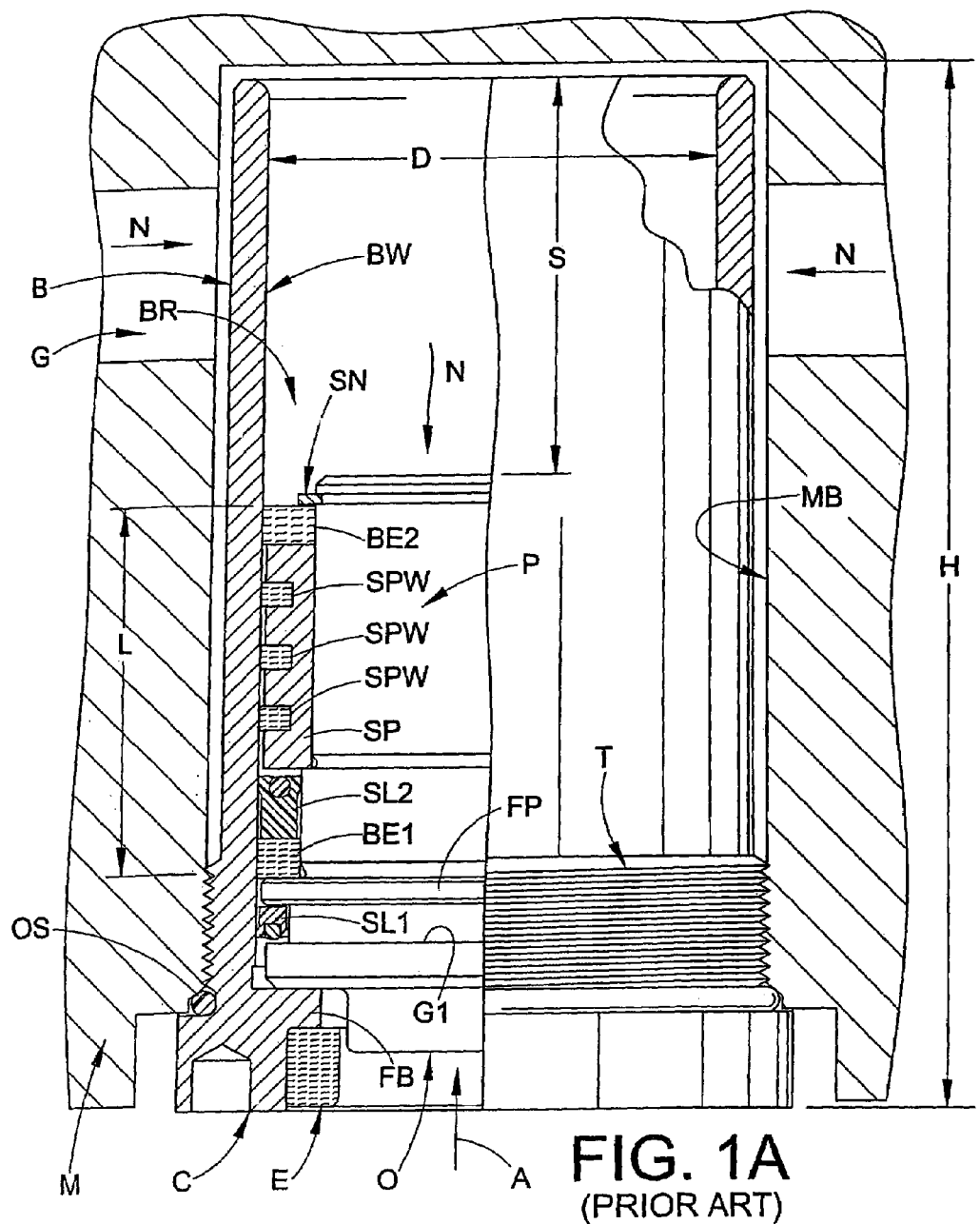
FIG. 1A is a sectional view as taken along line A-A of FIG. 1.
Figure 2:
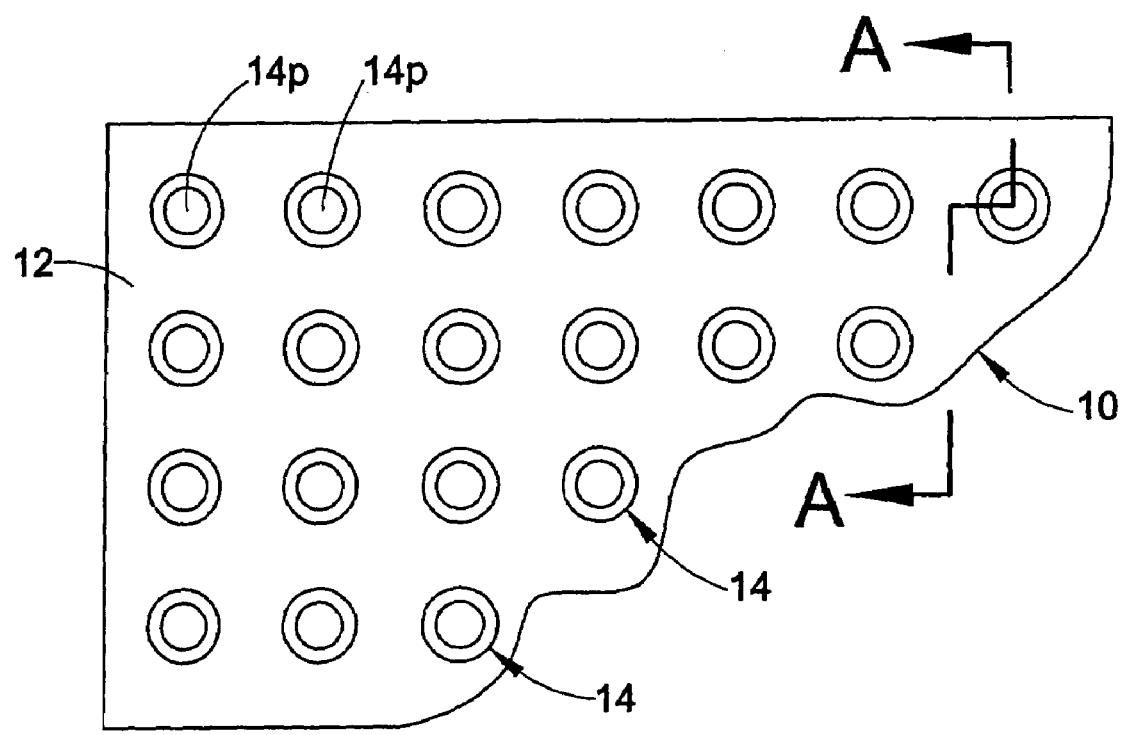
FIG. 2 is a partial plan view of a high-pressure inert gas cushion assembly formed in accordance with the present development and usable on the ram or bolster of a metal press.

FIG. 2 is a plan view that diagrammatically illustrates a high-pressure inert gas cushion assembly 10 for a ram or bolster of a metal stamping press formed in accordance with the present development. The cushion assembly 10 comprises a manifold 12 defined from steel or the like and a plurality of cylinders 14 formed in accordance with the present invention and operatively connected to the manifold to define a pattern of cylinders. As described above, a die is connected to the cushion 10 and overlies same, and actuation pins of the die engage at least some of the pistons 14p of the cylinders 14 for cushioning mating die portions. The cushion assembly 10 is a high-pressure cushion assembly, meaning that the inert gas used for biasing is contained in the manifold 12 at least 300 psi or at least 2068.5 kPa.

Figure 3A:
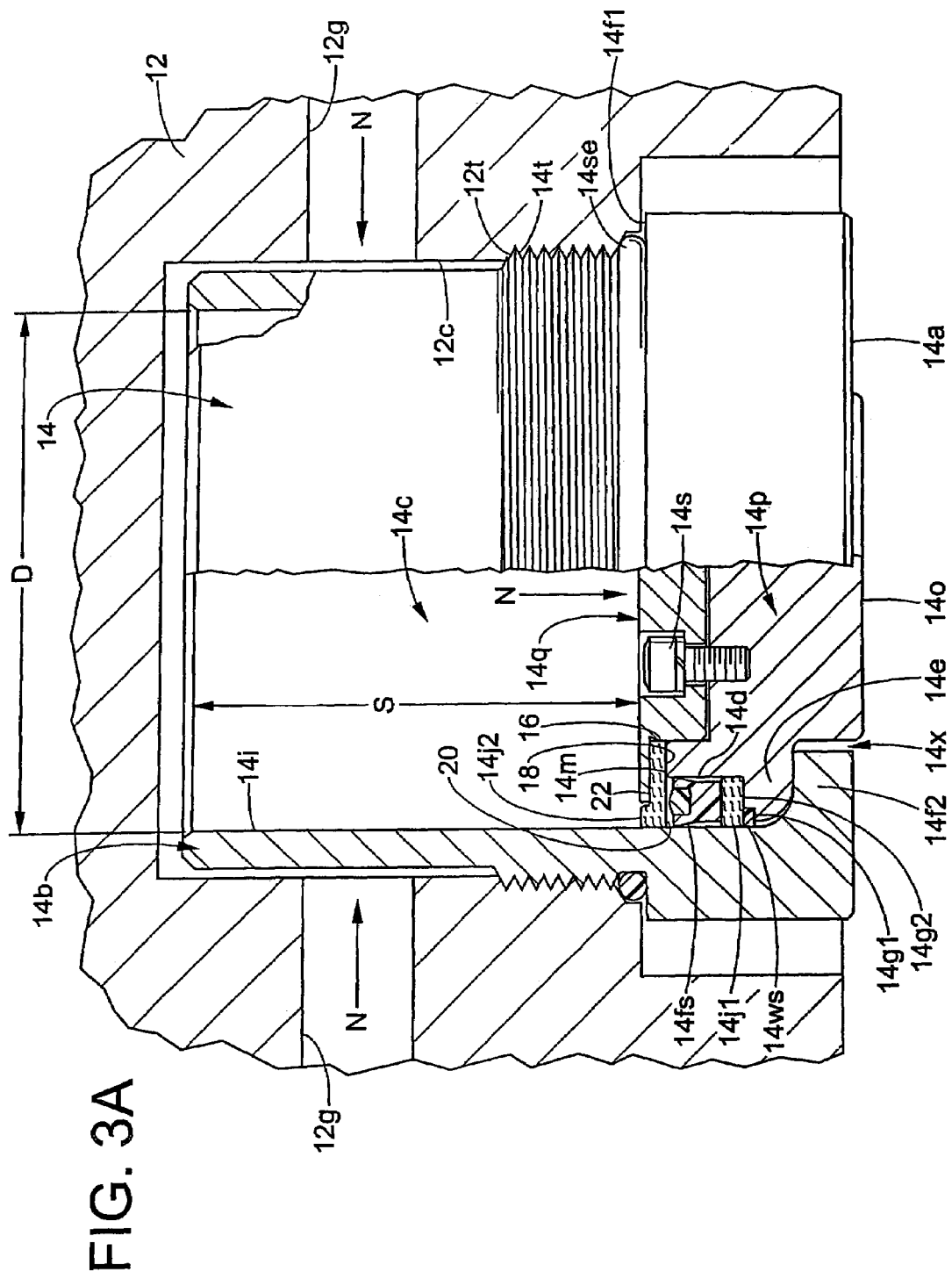
FIG. 3A is a sectional view through the cushion assembly of FIG. 2 as taken along line A-A.

FIG. 3A is a view taken along line A-A of FIG. 2 and illustrates a cylinder 14 formed in accordance with the present development as installed in the manifold 12 so as to form part of the cushion 10. The manifold 12 comprises fluid-flow passages 12g into which pressurized nitrogen N or another inert gas (e.g., argon) is introduced and sealed under pressure for biasing purposes as described below. A plurality of cylinder mounting locations or bores 12c are defined in the manifold 12 and are each in fluid communication with at least one fluid-flow passage 12g.

Each cylinder 14 comprises a body 14b that is located in a cylinder mounting bore 12c and secured therein using, e.g., mating threads 12t, 14t defined by the manifold 12 and body 14b, respectively, or by fasteners such as bolts, or by any other suitable and convenient means. An annular O-ring seal 14se surrounds the body 14b and seats against an outer flange 14f1 thereof. The seal 14se engages the manifold 12 when the cylinder body 14b is assembled into the manifold 12 so as to prevent escape of the biasing fluid from the manifold between the manifold and cylinder body 14b in the mounting bore 12c.

The cylinder body 14b is defined from steel or other metal or other material and includes inner wall 14i that defines a cylindrical bore 14c having a diameter D. A piston 14p defined from steel or any other suitable material is slidably mounted within the bore 14c and is adapted to reciprocate slidably in the bore axially a stroke distance S between an extended position (shown) and a retracted position. The piston 14p has opposite inner and outer faces 14m,14o, with the inner face 14m oriented inwardly relative to the bore 14c and the outer face 14o exposed and oriented outwardly relative to the bore 14c. The nitrogen or other gas contained in the passages 12g under pressure flows into the cylinder bore 14c (see arrows N) and biases the piston 14p of cylinder 14 to a normal, extended position as shown in FIG. 3A, so that the piston 14p abuts a radially inwardly extending flange 14f2 of the body 14b adjacent an outer end 14a of the cylinder body 14b. As shown, an outer face 14o of piston 14p extends a small distance (e.g., 1 mm) axially beyond the outer end 14a of the body 14b, but the face 14o can be flush with or recessed relative to outer end 14a of body. Also, when the cylinder 14 is operatively mounted in the mounting bore 12c of manifold 12, the outer end 14a of the body 14b is preferably flush or projects only slightly axially beyond the manifold 12. A small annular space 14x is defined between the flange 14f2 and piston 14p and, in the illustrated embodiment, this space remains open without being filled by an optional sleeve, bushing or the like to guide an associated die actuation pin DP (FIG. 4) that moves into engagement with the outer face 14o of piston 14p and that forces the piston 14p axially inward to a retracted position against the biasing force of the nitrogen gas or other pressurized fluid contained in the manifold 12. A peripheral surface 14d of the piston 14p is cylindrical and comprises a flange 14e that abuts flange 14f2 of body 14b when the piston 14p is in its fully extended position as shown in FIG. 3A.

An inner face of the flange 14e defines first and second steps 14g1, 14g2. An annular wiper seal member 14ws, preferably defined from polytetrafluoroethylene (PTFE), such as that sold under the registered trademark TEFLON®, or another polymeric material, is seated on step 14g1 and closely surrounds and sealingly engages the piston 14p. The wiper seal 14ws slidably abuts and sealingly engages the inner wall 14i of body so as to prevent entrance of debris into bore 14c.

Figure 17:
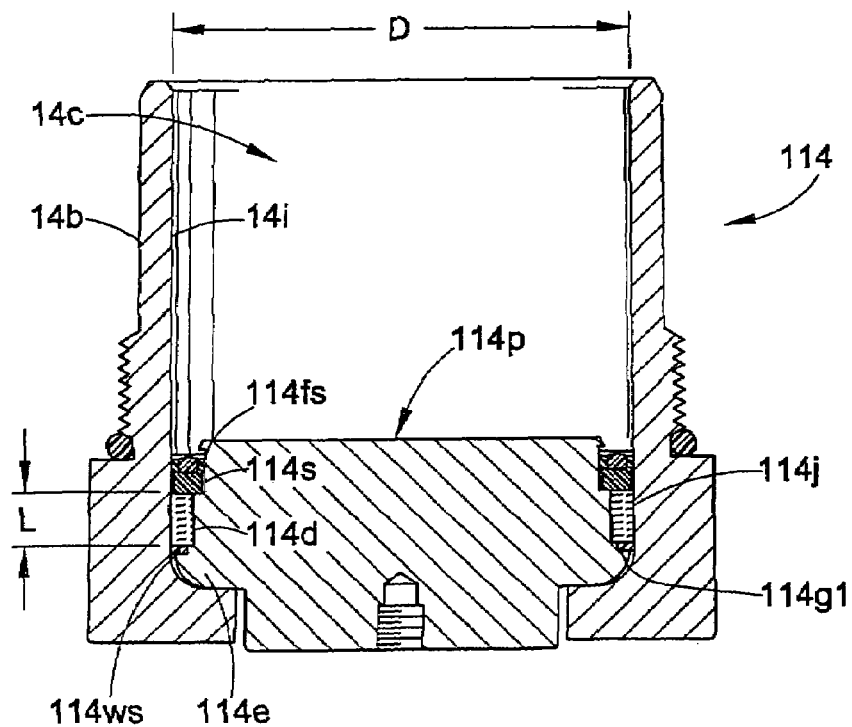

The cylinder 14 comprises first and second bearings 14j1, 14j2 that slidably support piston 14p in bore 14c for movement between the extended and retracted positions (additional bearings can be provided and, as described in relation to FIG. 17, a single bearing can be used). The first or outer annular bearing 14j1 is defined from a phenolic resin or other polymeric or other material and closely surrounds the piston outer surface 14d and is abutted axially against the second step 14g2. The first bearing 14j1 also slidably abuts the inner wall 14i of bore 14c. It is important to note that the first bearing 14j1 abuts and axially compresses the wiper seal 14ws between itself and the step 14g1 so as to radially expand the wiper seal 14ws and improve its sealing engagement with the inner wall 14i. In the illustrated embodiment, the first bearing 14j1 is simply a cylindrical ring-shaped member.

The cylinder 14 further comprises an annular fluid seal 14fs that closely surrounds the piston outer surface 14d and that is sealingly engaged with same. The fluid seal 14fs slidably abuts and sealingly engages the inner wall 14i of body 14b and prevents escape of nitrogen gas N or other biasing fluid from bore 14c between piston 14p and inner wall 14i. The seal 14fs is preferably a U-cup or similar seal defined from a polymeric material, but it is not intended that the invention be limited to a particular seal.

The second annular bearing 14j2 is provided and preferably defined from the same material as the first bearing 14j1. The first and second bearings 14j1,14j2 are axially spaced-apart, and the second bearing 14j2 is defined by an annular disc having a central opening 16 and comprising an inner portion having a first axial thickness d1 (see FIG. 3B) and an outer portion having a second axial thickness d2 that is greater than d1. The second bearing 14j2 defines a planar outer surface 18 that abuts a planar inner face 14m of the piston 14p. An axial clearance space 20 is defined between the fluid seal 14fs and the second bearing so that the bearing 14j2 does not interfere with operation of the seal 14fs or damage same.

Owing to the fact that the bearing 14j2 has a variable thickness, a recess 22 is defined. The second bearing 14j2 is operatively secured to the piston 14p by a cap-like retainer 14q that comprises a central body 14q1 and a radial flange 14q2. The central body 14q1 of retainer 14q is very closely received within a recess 14r of piston 14p and the flange 14q2 of retainer is received within the annular recess 22 of second bearing 14j2. The retainer 14q is fixedly secured to the piston by suitable means such as capscrews 14s or the like and captures the bearing 14j2 to the piston. It is important that the retainer 14q and piston 14p be axially aligned owing to the fact that misalignment between piston 14p and retainer 14q will cause corresponding misalignment between the first and second bearings 14j1,14j2. As such, the central body 14q1 of retainer fits very closely and with the minimum possible radial clearance within central opening 16 of the second bearing 14j2 and the recess 14r of piston and tight tolerances are held on these fits to ensure proper alignment between the retainer 14q and piston 14p and also between the first and second bearings 14j1,14j2 which ensures that the bearings 14j1,14j2 are able to resist tipping forces exerted on the piston 14p. The capscrews 14s ensure a firm attachment between the retainer 14q and piston 14p, and use of capscrews 14s or like fastening means allows the second bearing 14j2 to be tightly held beneath the retainer flange 14q2 so that the bearing is better able to resist tipping of the piston 14p in the cylinder bore 14c, i.e., the fact that the second bearing 14j2 is immovably secured to the piston 14p prevents relative movement between the piston and bearing as has been found to reduce the ability of the bearing to reduce tipping forces. It should be noted here that the central body 14q1 of the retainer 15q preferably does not bottom-out in the recess 14r of the piston so as to ensure that sufficient clamping force is generated. Other fastening means for securing the retainer 14q to the piston 14p, e.g., threads or the like, are contemplated and deemed to be within the scope and intent of the invention. When the various components are operatively assembled as described, the flange 14q2 of retainer 14q axially compresses a portion of the second bearing 14j2 between itself and the inner face 14m of piston 14p, and the thicker, radially outer portion of bearing 14j2 projects radially outward beyond the periphery 14d of piston 14p so as to be unsupported or cantilevered relative thereto. Because of the cantilevered nature of the second bearing 14j2 relative to the piston periphery 14d, the retainer flange 14q2 preferably extends radially outward relative to the piston periphery 14d in order to add rigidity and strength to the thinner portion of the second bearing 14j2. In the illustrated embodiment, the thicker outer portion of the second bearing is completely unsupported by the piston 14p and/or retainer flange 14q2.

The bearings 14j1,14j2 slidably support the piston P in the bore 14c. The bearings 14j1,14j2 define inclusively therebetween an axial bearing-length L.

The bearing-length L is the maximum axial distance between the outermost bearing (in this case 14j1) and the innermost bearing (in this case 14j2). In the case where only a single bearing member is used, the bearing-length L would correspond to the axial length of the single bearing member. The bore 14c defines a diameter D (FIG. 3A). The cylinder 14 is constructed so that the ratio of bearing-length L to diameter D (L:D) is equal to or less than 1:2.5, i.e., L is less than or equal to four-tenths or 40% of the diameter D of bore 14c (i.e., L:D≦0.4). Preferably, the cylinder 14 defines a ratio L:D less than or equal to 1:4 (0.25 or 25%) and, in the illustrated embodiment, the ratio L:D is about 1:5 (0.2 or 20%). This structural relationship is critical to reduce the height of the cylinder 14 for a given stroke distance of the piston 14p as described in full detail below.

Figure 4:
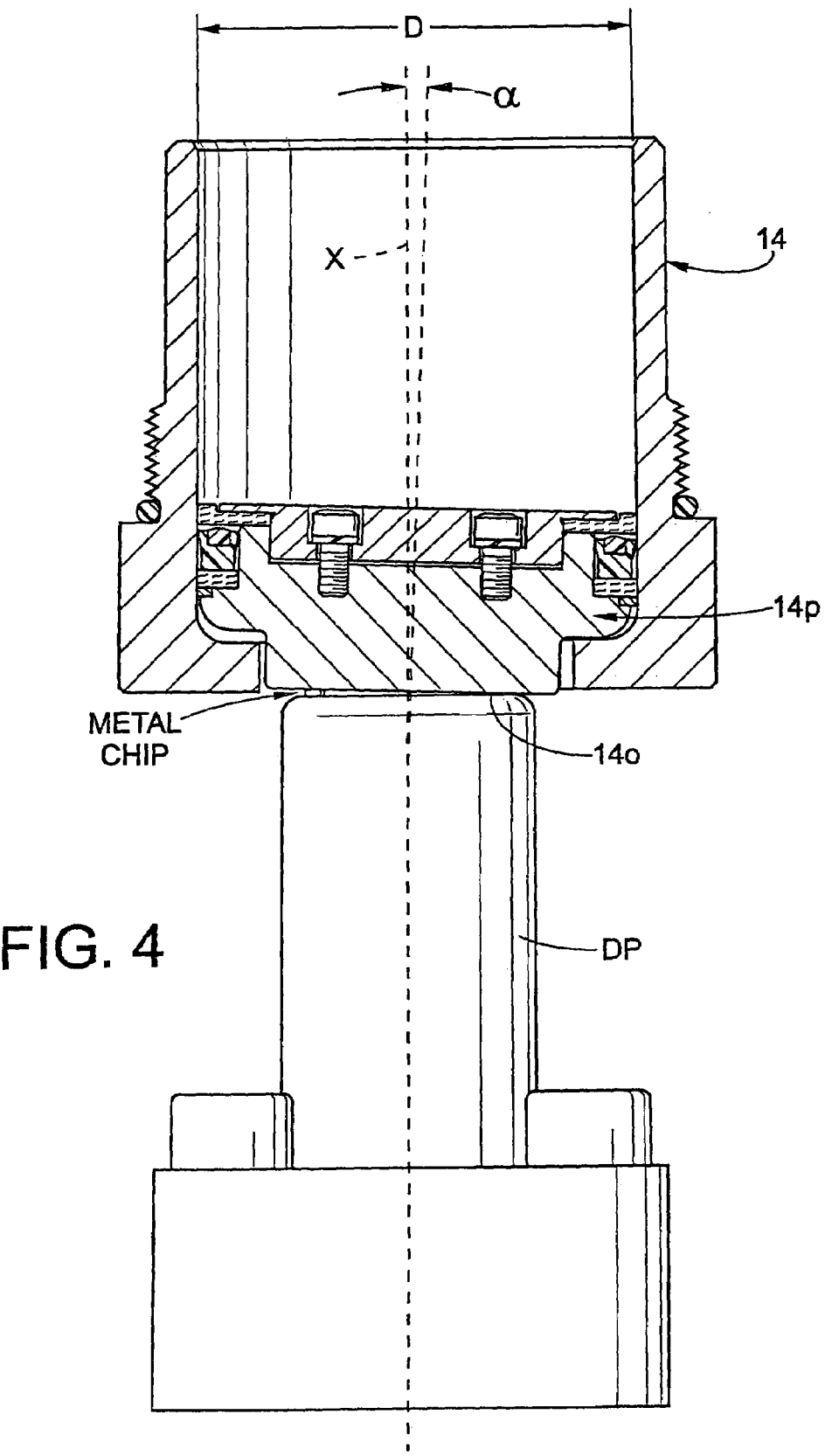
FIG. 4 is a sectional view of a cushion cylinder formed in accordance with the present development and shows engagement of same by a pin of an associate metal-working die.

Because of the required L:D being less than or equal to 1:2, the manufacturing tolerances of the components including bore 14c, piston 14p, bearings 14j1,14j2 and retainer 14q must be maintained sufficiently tight so that the piston 14p is resistant to tipping in the bore 14c. As shown in FIG. 4, it is preferred that, in the event that a metal chip or the like is located between a die actuation pin DP and the outer face 14o of piston 14p, piston will rotate no more than a 1 degree nominally and (0.5-3.3 degrees allowing for tolerance stack-up) off of the longitudinal axis X of bore 14c. FIG. 4 shows a tipping angle α=1.5 degrees. In a high-pressure cushion assembly 10 having a manifold 12 charged with high-pressure inert gas and having multiple cushion cylinders connected to the manifold, it is critical that the bearings 14j1,14j2 do not allow the piston 14p to tip to a position where it becomes immovably lodged in the bore 14c and/or where the seal 14fs is unable to prevent the escape of the high-pressure nitrogen or other biasing gas from the bore 14c, whereas escape of biasing gas in a conventional low-pressure system connected to a source of compressed air is relatively inconsequential.

FIGS. 5A and 5B provide a side-by-side comparison of the cylinder 14 with the conventional cylinder C. The cylinders 14,C provide equal maximum stroke distances S for the pistons 14p,P, respectively. For this stroke distance S, the height, H' of cylinder 14 is significantly less than the height H of cylinder C owing to the reduced L:D ratio of cylinder 14 as compared to the cylinder C. As such, use of the cylinder 14 allows for use of reduced-height manifolds to increase the press-open space available for dies as has been deemed highly desirable in the art of metal forming.

FIG. 6 is a partial sectional view of a cushion cylinder 14' formed in accordance with an alternative embodiment of the present development. Except as otherwise shown and/or described herein, the cylinder 14' is identical to the cylinder 14 and, as such, like components are identified with like reference characters including a primed (') suffix and are not further discussed. The cylinder 14' comprises a piston 14P'' in which the flange 14e' is not stepped. Instead, the flange 14e' comprises a planar surface 30 on which the first bearing 14j1' is supported. The bearing 14j1' defines a groove 32 in which the wiper 14ws' is seated and captured between the bearing 14j1' and the flange 14e'.

Figure 7:
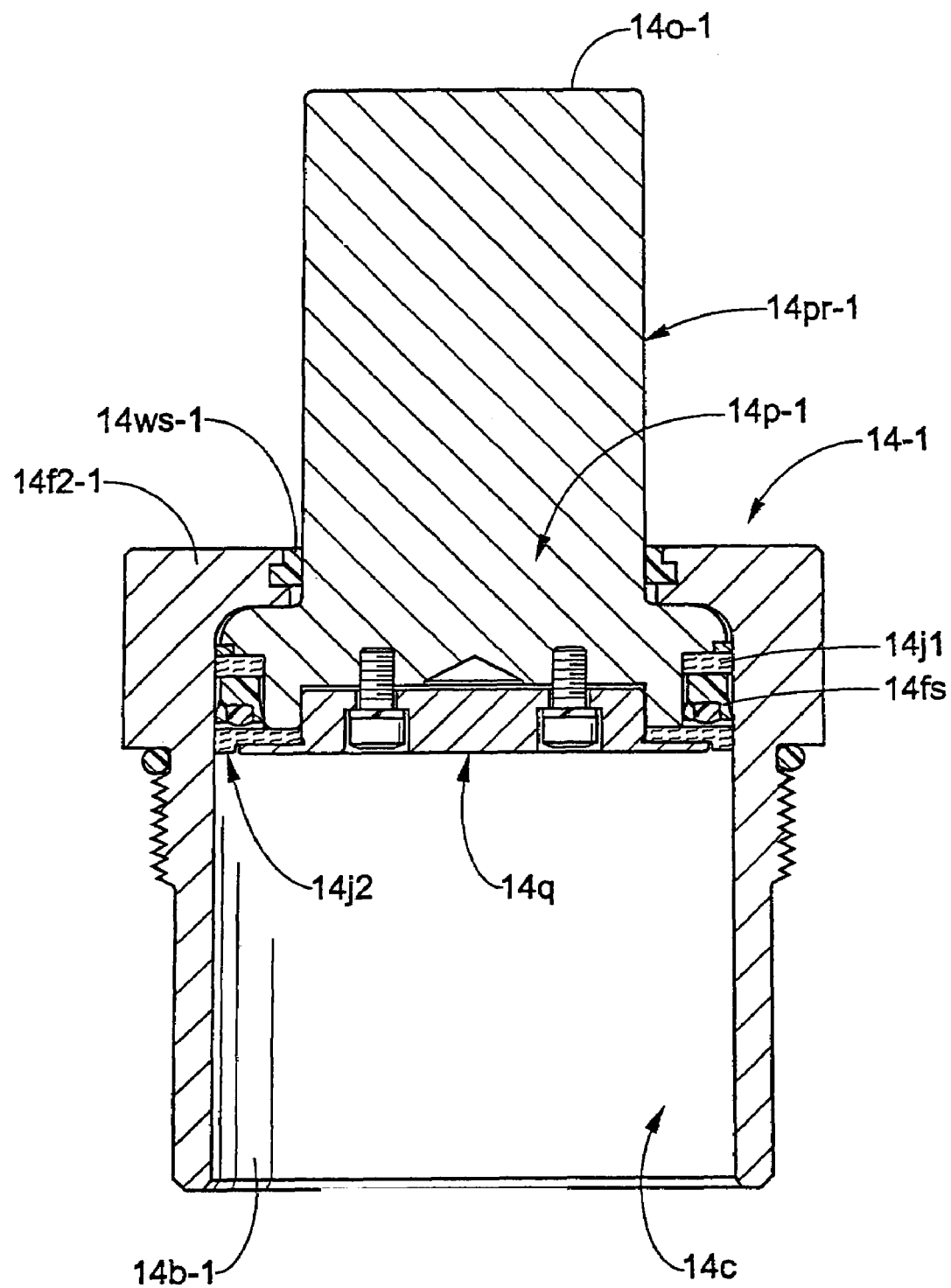
FIG. 7 is a sectional view of a bolster cushion cylinder formed in accordance with an alternative embodiment of the present development.

FIG. 7 is a sectional view of a bolster cushion cylinder 14-1 formed in accordance with an alternative embodiment of the present development. Except as otherwise shown and/or described, the bolster cushion cylinder is identical to the cushion cylinder 14 described above. Unlike the cushion cylinder 14, however, the bolster cushion cylinder 14-1 is specifically adapted for being used on the bolster side of a metal stamping press and, as such, the piston 14p-1 comprises an elongated rod portion 14pr-1 that projects axially out of the cylinder bore 14c. Also, because it is intended for use as part of a bolster cushion, the cylinder 14-1 is located with the outer face 14o-1 of the piston 14p-1 oriented upward during use. Therefore, the cylinder 14-1 further comprises a wiper seal 14ws-1 mounted to the flange 14f2-1 of the body 14b-1 and slidably engaged with the rod portion 14pr-1 to inhibit ingress of dirt, oil, metal chips and other contaminants into the bore 14c when the piston 14p-1 is stroked inward to its retracted position during use.

Figure 8:
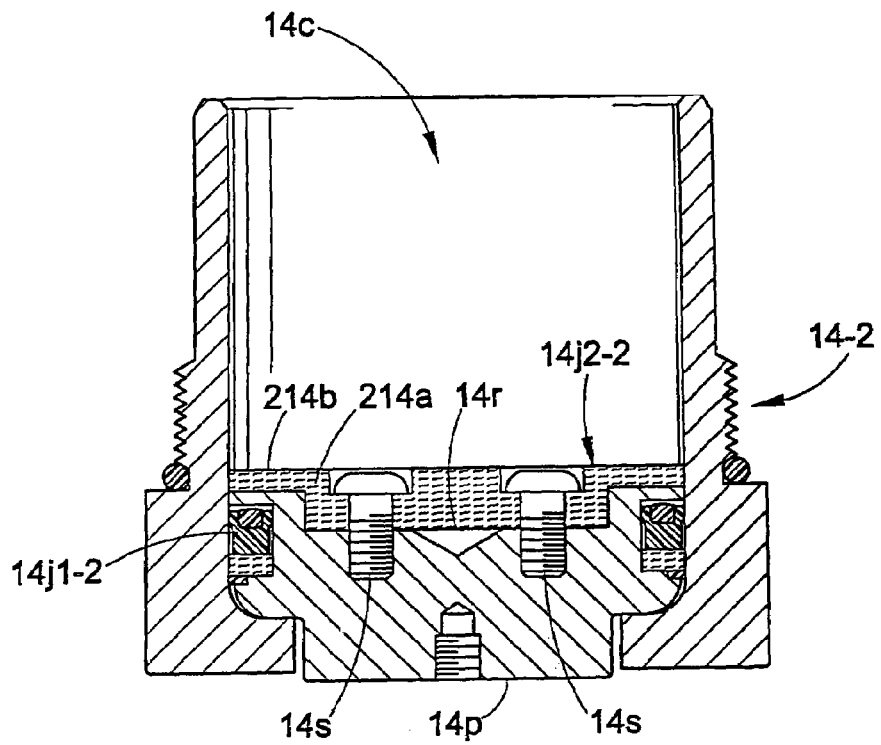
FIGS. 8-17 respectively show additional alternative embodiments of cushion cylinders formed in accordance with the present development.

FIG. 8 illustrates a cushion cylinder 14-2 that is identical to the cushion cylinder 14 described above, except that the second bearing 14j2-2 is directly fixedly secured to the piston 14p without use of a separate retainer. More particularly, the second bearing 14j2-2 comprises a central body portion 214a that is closely received in the recess 14r of piston 14p. The second bearing further comprises a circular bearing disc 214b that projects radially outward from the central body portion 214a and that closely fits within the bore 14c of the cylinder body 14b to cooperate with the first bearing 14j1-2 in slidably supporting the piston 14p in the bore 14c. The second bearing 14j2-2 is fixedly secured to the piston 14p by fasteners 14s or the like which are button-head cap screws with a locking patch on the threads in the illustrated embodiment.

Figure 9:
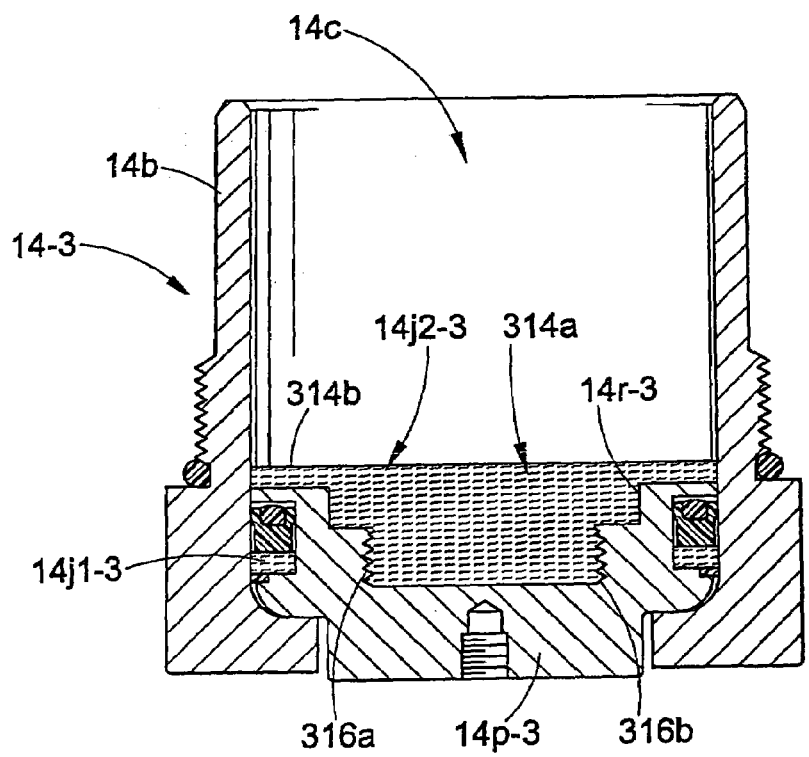

FIG. 9 illustrates another cushion cylinder 14-3 that is identical to the cushion cylinder 14 described above, except that the second bearing 14j2-3 is directly fixedly secured to the piston 14p-3 without use of a separate retainer. The second bearing 14j2-3 comprises a central body portion 314a that is closely received in the recess 14r-3 of piston 14p-3. The second bearing 14j2-3 further comprises a circular bearing disc 314b that projects radially outward from the central body portion 314a and that closely fits within the bore 14c of the cylinder body 14b to cooperate with the first bearing 14j1-3 in slidably supporting the piston 14p-3 in the bore 14c. Unlike the embodiment 14-2 of FIG. 8, the second bearing 14j2-3 is directly threadably connected to the piston 14p-3. To that end, the recess 14r-3 of piston 14p-3 and central body 314a of second bearing comprise mating threads 316a,316b, respectively, that cooperate to secure the second bearing fixedly to the piston 14p-3. As in all embodiments, the bearing 14j2-3 cannot move axially or radially relative to the piston 14p-3.

Figure 10:
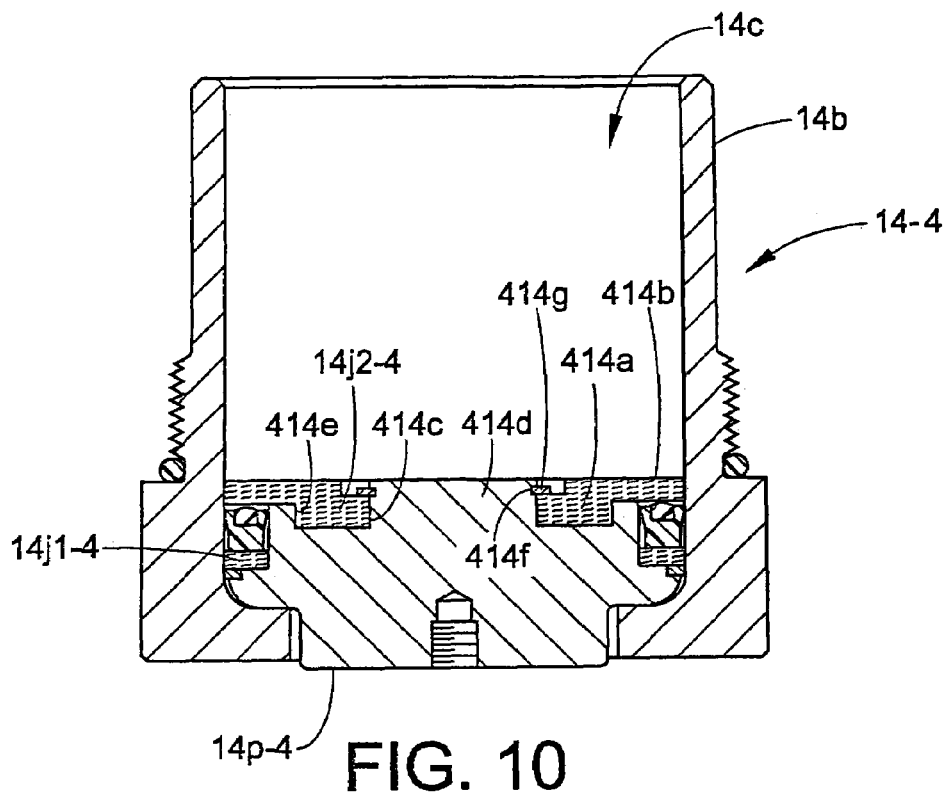

FIG. 10 shows an embodiment of a cushion cylinder 14-4 that is identical to the cushion cylinder 14 described above, except as otherwise shown and/or described. The cushion cylinder 14-4 is also similar to the embodiments 14-2 and 14-3 just described, except that the second bearing 14*j*2-4 is fixedly secured to the piston 14*p*-4 in a different fashion. The bearing 14*j*2-4 comprises a central body 414*a* and a circular bearing disc 414*b* that projects radially outward from the central body and that closely fits within the bore 14*c* of the cylinder body 14*b* to cooperate with the first bearing 14*j*1-4 in slidably supporting the piston 14*p*-4 as described above. The central body 414*a* of the second bearing 14*j*2-4 comprises an opening 414*c* that is closely received over a boss 414*d* of the piston 14*p*-4. The second bearing 14*j*2-4 is also seated in an annular depression 414*e* of the piston and is thus unable to move radially relative to the piston. The boss 414*d* comprises a peripheral groove 414*f* and a retaining ring 414*g* such as a C-clip or the like is installed in the groove 414*f* and is also axially abutted with the body 414*a* of the second bearing to secure the bearing to the piston 14*p*-4 and to prevent axial movement of the bearing.

Figure 11:
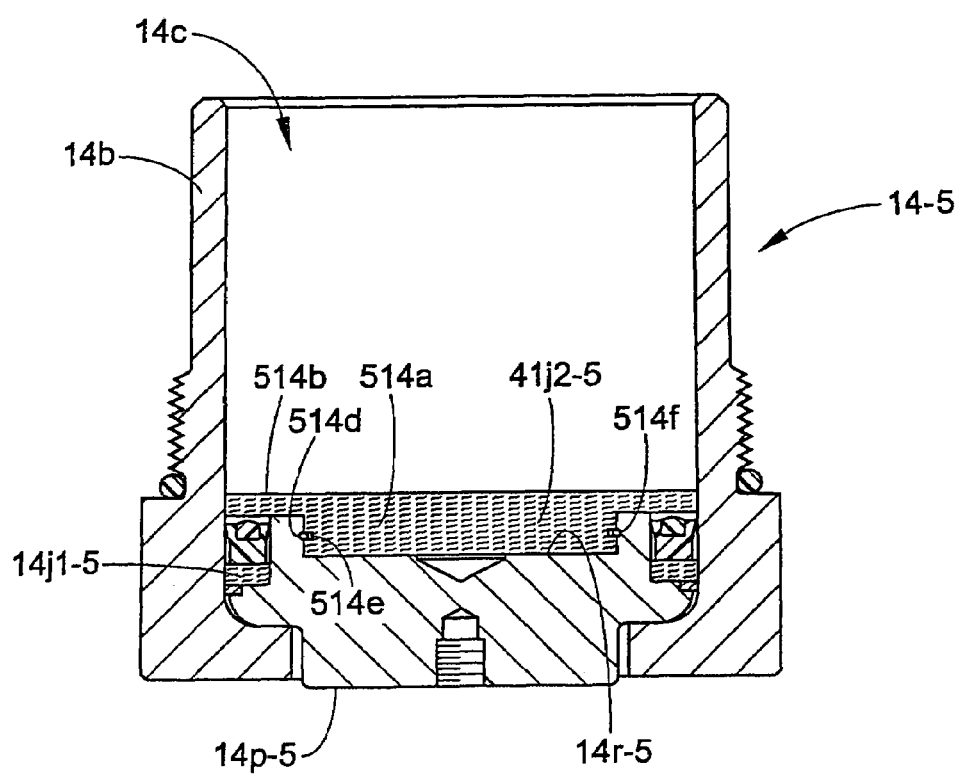

FIG. 11 shows an embodiment of a cushion cylinder 14-5 that is identical to the cushion cylinder 14 described above, except as otherwise shown and/or described. The cushion cylinder 14-5 is also similar to the embodiment 14-4 just described, except that the second bearing 14*j*2-5 is fixedly secured to the piston 14*p*-5 in a different fashion. The bearing 14*j*2-5 comprises a central body 514*a* and a circular bearing disc 514*b* that projects radially outward from the central body 514*a* and that closely fits within the bore 14*c* of the cylinder body 14*b* to cooperate with the first bearing 14*j*1-5 in slidably supporting the piston 14*p*-5 as described above. The central body 514*a* of the second bearing is closely received in a recess 14*r*-5 of the piston 14*p*-5. The recess 14*r*-5 and the central body 514*a* define respective annular grooves 514*d*,514*e* that are axially aligned when the body is fully installed in the recess 14*r*-5. Before the bearing body 514*a* is installed, in the recess 14*r*-5, a c-clip or other snap-ring retainer 514*f* is seated in the annular groove 514*e* thereof and then radially compressed to allow the body 514*a* to be slidably received in the piston recess 14*r*-5. The retainer 514*f* resiliently radially expands when it becomes aligned with the annular groove 514*d* of the recess so as to capture the second bearing 14*j*2-5 to the piston and restrain same against axial movement relative to the piston. Here, again, the bearing 14*j*2-5 is prevented from radial movement relative to piston 14*p*-5 owing to the very close fit between the central body 514*a* thereof and the piston recess 14*r*-5.

Figure 12:
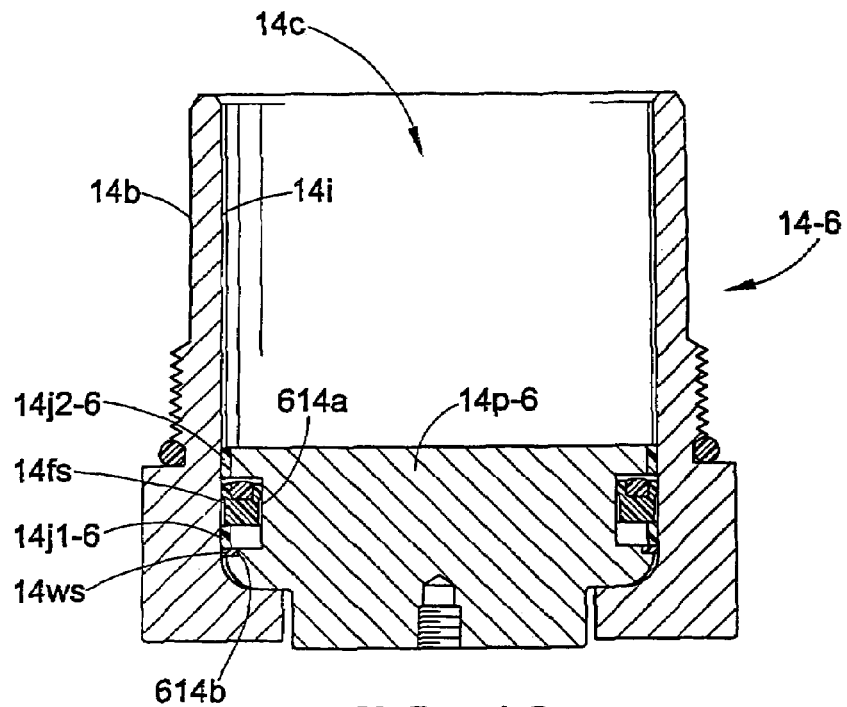

FIG. 12 illustrates an embodiment of a cushion cylinder 14-6 that is identical to the cushion cylinder 14 described above, except as otherwise shown and/or described. The piston 14*p*-6 comprises a first annular peripheral groove 614*a* in which the fluid seal 14*fs* is seated. The seal 14*fs* slidably abuts the inner wall 14*i* of bore 14*c* to prevent escape of the nitrogen or other inert biasing gas between the piston 14*p*-6 and the wall 14*i* of bore 14*c*. The piston comprises a second annular groove 614*b* located axially outward relative to the first groove 614*a* and in which a wiper seal 14*ws* is seated and slidably engaged with the inner wall 14*i* to clean and lubricate same and to inhibit passage of contaminants into the bore 14*c*. The first and second bearings 14*j*1-6,14*j*2-6 are each circular ring bearings that are press-fit onto the periphery of the piston 14*p*-6 on opposite sides of the first annular groove 614*a* and slidably support the piston 14*p*-6 in the bore 14*c*. The first and second bearings are defined from any suitable material such as a bearing material deposited on a metal base such as steel, brass, aluminum or the like.

Figure 13:
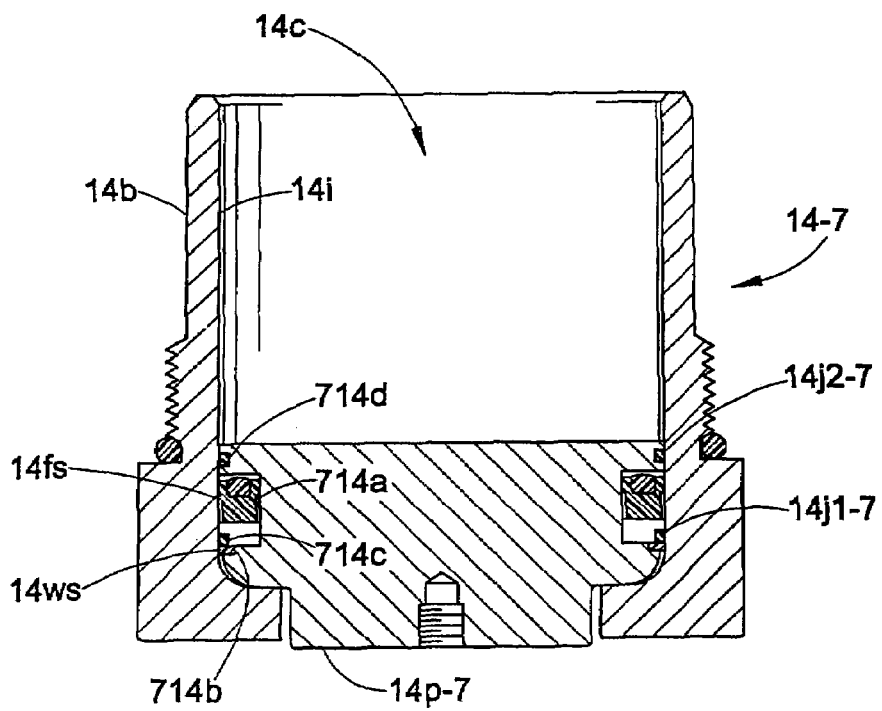

FIG. 13 illustrates an embodiment of a cushion cylinder 14-7 that is identical to the cushion cylinder 14-6 just described in relation to FIG. 12, except as shown and/or described. The piston 14*p*-7 comprises a first annular peripheral groove 714*a* in which the fluid seal 14*fs* is seated. The seal 14*fs* slidably abuts the inner wall 14*i* of bore 14*c* to prevent escape of the nitrogen or other biasing fluid between the piston 14*p*-7 and the wall 14*i* of bore 14*c*. The piston further comprises a second annular groove 714*b* located axially outward relative to the first groove 714*a* and in which a wiper seal 14*ws* is seated and slidably engaged with the inner wall 14*i* to clean and lubricate same and to inhibit passage of contaminants into the bore 14*c*. Unlike other embodiments, the piston 14*p*-7 further comprises annular peripheral grooves 714*c*,714*d* in which the first and second bearings 14*j*1-7,14*j*2-7 are respectively seated. The first bearing-receiving groove 714*c* is located immediately axially inward from the wiper-seal groove 714*b* and intersects same so that the first bearing 14*j*1-7 abuts the wiper seal 14*ws*. The second bearing-receiving groove 714*d* is located axially inward and spaced from the seal-receiving groove 714*a*. The first and second bearings 14*j*1-7,14*j*2-7 are each split bearings that are either wrapped into position or are pre-formed in a circular shaped that is radially expanded for installation on the piston 14*p*-7. Here, again, the first and second bearings are defined from any suitable material such as bronze-filled PTFE or the like.

Figure 14:
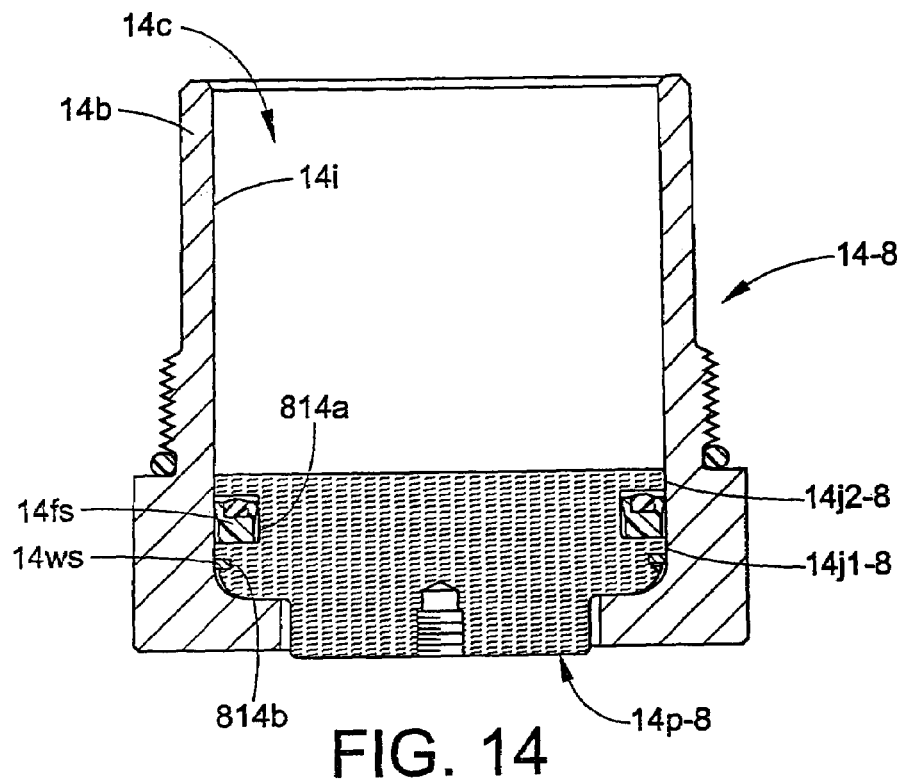

The first and second bearings can be integral and/or defined as a one-piece construction with the piston. FIG. 14 an example of such a cushion cylinder 14-8 that is identical to the cushion cylinder 14 described above, except as otherwise shown and/or described. The piston 14*p*-8 comprises one-piece construction defined entirely from a suitable polymeric or other bearing material. The piston 14*p*-8 defines a first annular peripheral groove 814*a* in which the fluid seal 14*fs* is seated. The seal 14*fs* slidably abuts the inner wall 14*i* of bore 14*c* to prevent escape of the nitrogen or other inert biasing gas between the piston 14*p*-8 and the wall 14*i* of bore 14*c*. The piston further defines a second annular groove 814*b* located axially outward relative to the first groove 814*a* and in which a wiper seal 14*ws* is seated and slidably engaged with the inner wall 14*i* to clean and lubricate same and to inhibit passage of contaminants into the bore 14*c*. The first and second bearings 14*j*1-8,14*j*2-8 are each defined as a one-piece construction with the piston 14*p*-8 and each are defined by a circular peripheral portion of the piston 14*p*-8 and cooperate to support the piston 14*p*-8 slidably in the bore 14*c*.

Figure 15:
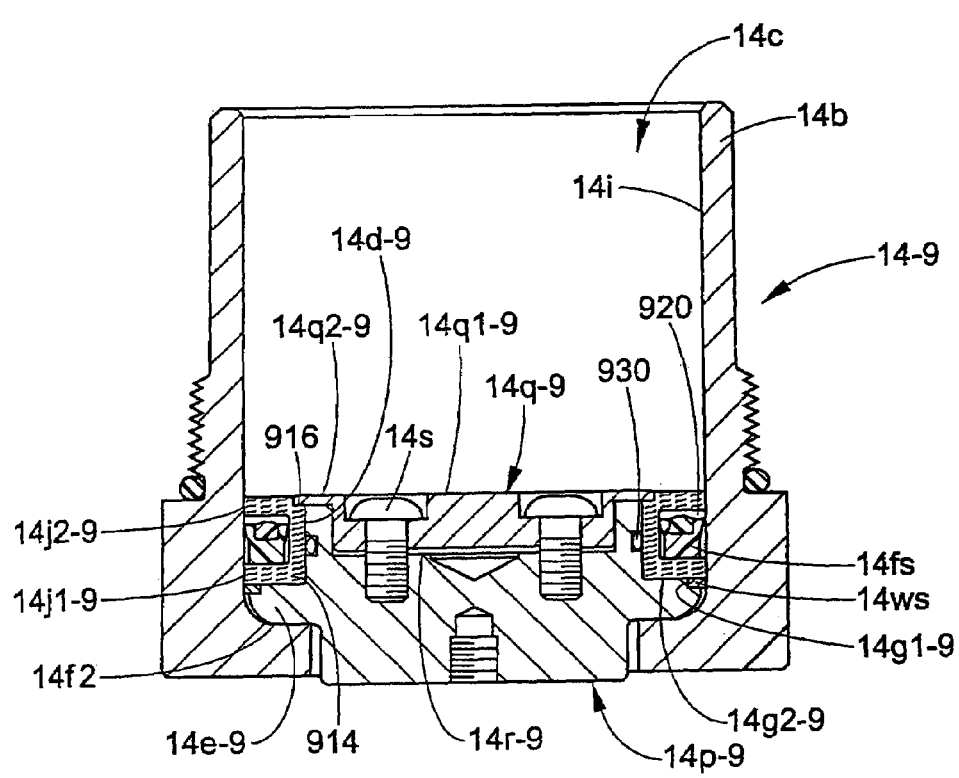

Referring now to FIG. 15, another alternative cushion cylinder embodiment 14-9 is illustrated and is identical to the cushion cylinder 14 except as otherwise shown and/or described. A peripheral surface 14*d*-9 of the piston 14*p*-9 is cylindrical and comprises a flange 14*e*-9 that abuts flange 14*f*2 of body 14*b* when the piston 14*p*-9 is in its fully extended position. An inner face of the flange 14*e*-9 defines first and second steps 14*g*1-9,14*g*2-9. The annular wiper seal member 14*ws* is seated on the first step 14*g*1-9 and slidably abuts and sealingly engages the inner wall 14*i* of body so as to prevent entrance of debris into bore 14*c*.

The cylinder 14-9 comprises first and second bearings 14*j*1-9,14*j*2-9 that abut the inner wall 14*i* and slidably support piston 14*p* in bore 14*c* for movement between the extended and retracted positions. The first and second bearings 14*j*1-9, 14*j*2-9 are defined together as a one-piece construction as an annular bearing member 914 having a U-shaped cross-section that defines a seal-receiving groove 920 in which the fluid seal 14*fs* is seated so as to be slidably engaged with the body inner wall 14*i* of the body 14*b* to prevent escape of the pressurized nitrogen gas or other inert biasing gas between the inner wall 14*i* and the bearing member 914. The bearing member 914 is defined from a suitable bearing material such as a phenolic resin or other material and closely surrounds the piston outer surface 14d-9 and is abutted axially against the second step 14g2-9. A seal 930 such as an O-ring or the like is seated in a groove and surrounds the piston outer surface 14d-9 and sealingly engages the bearing member 914 to the piston 14d-9 to prevent escape of the biasing gas therebetween. The bearing member 914 axially abuts and axially compresses the wiper seal 14ws between itself and the step 14g1-9 so as to radially expand the wiper seal 14ws and improve its sealing engagement with the inner wall 14i.

The bearing member 914 is operatively secured to the piston 14p-9 by a cap-like retainer 14q-9 that comprises a central body 14q1-9 and a radial flange 14q2-9. The central body 14q1-9 is very closely received within a recess 14r-9 of piston and the flange 14q2-9 of retainer abuts the bearing member 914 and captures same to the piston 14p-9. Preferably, the bearing member 914 defines a recess 916 in which the flange 14q2-9 is seated so as to be axially flush with the bearing member. The retainer 14q-9 is fixedly secured to the piston 14p-9 by suitable means such as capscrews 14s or the like and captures the bearing member 914 to the piston. Other fastening means for securing the retainer 14q to the piston 14p, e.g., threads or the like, are contemplated and deemed to be within the scope and intent of the invention. Given the above construction and assembly, the bearing member 914 is unable to move relative to the piston 14p-9.

Figure 16:
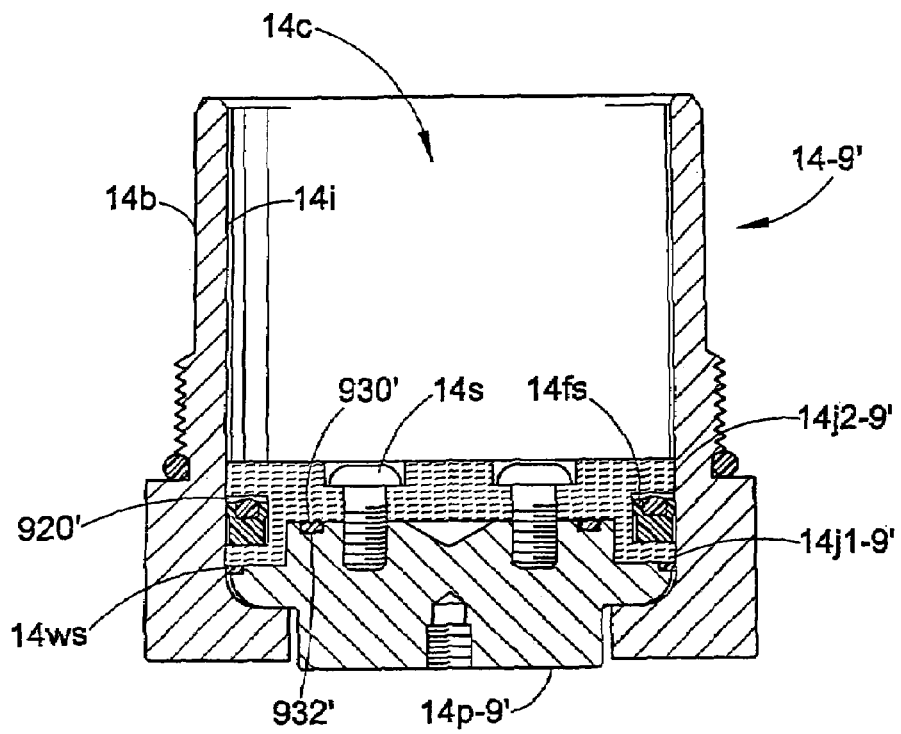

FIG. 16 illustrates an alternative to the cushion cylinder at 14-9'. Except as otherwise shown and/or described, the cylinder 14-9' is identical to the cushion cylinder 14-9. In the cylinder 14-9', the bearing member 914 and retainer 14q-9 are integrated into a one-piece bearing member 914' comprising the first and second phenolic resin or other bearings 14j1-9', 14j2-9' that is directly fixedly secured to the piston 14p-9' by fasteners 14s. At the interface of the bearing member 914' and the piston 14p-9', the piston defines a groove 932' in which an O-ring seal or the like is seated and compressed by the bearing member 914' to prevent escape of biasing fluid between the bearing member and the piston. The bearing member 914' defines the peripheral groove 920' in which the fluid seal 14fs is seated. As noted above, the seal 14fs is slidably engaged with the inner wall 14i and prevents escape of the biasing gas between the bearing member 914' and the inner wall 14i.

FIG. 17 illustrates a cushion cylinder 114 that is identical to the cushion cylinder 14 described above except as otherwise shown and/or described. The cylinder 114 comprises a single bearing 114j that is located in abutment with the inner wall 14i of the body and slidably supports the piston 114p in the bore 14c. The bearing 114j is defined as an annular member from any suitable bearing material such as a phenolic resin or other polymeric or other material and closely surrounds the piston outer surface 114d with a press-fit. The piston 114p defines flange 114e on which the wiper seal 114ws is seated. The wiper seal slidably abuts the inner wall 14i and cleans/lubricates same. The bearing 114j is axially abutted with the wiper seal 114ws. The piston outer surface 114d further defines a peripheral groove 114s in which a fluid seal 114fs is seated. The seal is slidably abutted with the inner wall 14i and prevents escape of the biasing gas or other fluid between the piston outer surface 114d and the inner wall 14i. The single bearing 114j defines a bearing length L; the bore 14c defines a diameter D, and the cushion cylinder 114 satisfies the critical L:D ratio as defined above in connection with the cushion cylinder 14.

The invention has been described with reference to a preferred embodiment. Modifications and alterations will occur to those of ordinary skill in the art upon reading this specification. It is intended that the invention be construed as including all such modifications and alterations.

The invention claimed is:

1. A cushion for a ram or bolster of a metal stamping press, said cushion comprising:
    a manifold comprising fluid-flow passages and a plurality of cylinder mounting locations each in communication with at least one of the fluid-flow passages;
    a plurality of cushion cylinders located respectively in said plurality of cylinder mounting locations, each cushion cylinder comprising:
    a body comprising an inner wall that defines a bore having a diameter D;
    a piston located in said bore and comprising a cylindrical outer surface and opposite inner and outer faces, both said inner and outer faces arranged transverse to said cylindrical outer surface, wherein said outer face is oriented outwardly relative to said bore and said manifolds, and wherein said inner face defines an axially innermost face;
    a fluid seal supported on said piston and slidably engaged with said inner wall defining said bore;
    a bearing retainer connected to said piston;
    first and second axially spaced-apart bearings supported on said piston and slidably engaged with said inner wall defining said bore, said first and second bearings cooperating to support said piston slidably in said bore for reciprocal sliding movement between an extended position, where said piston is located adjacent an outer end of said body, and a retracted position, where said piston is moved axially into said bore away from said outer end of said body, said bearings defining inclusively therebetween a bearing-length L that is less than or equal to 25% of said bore diameter D; wherein said second bearing is located axially inward from said first bearing and is secured to said piston by said bearing retainer with a first part of said second bearing clamped to and covering at least part of said transverse inner face of said piston and a second part of said second bearing projecting outwardly beyond and cantilevered relative to said cylindrical outer surface of said piston and slidably engaged with said inner wall defining said bore such that said second bearing abuts said axially inner most face of said piston, and wherein said fluid seal is located axially between said first and second bearings.

2. The cushion as set forth in claim 1, wherein each of said plurality of cushion cylinders further comprises a wiper seal located on said piston axially outward from said first bearing, wherein said wiper seal is slidably engaged with said inner wall of said body that defines said bore and inhibits entry of contaminants into said bore between said piston and said inner wall.

3. A cushion for a ram or bolster of a metal stamping press, said cushion comprising:
    a manifold comprising fluid-flow passages and a plurality of cylinder mounting locations each in communication with at least one of the fluid-flow passages;
    a plurality of cushion cylinders located respectively in said plurality of cylinder mounting locations, each cushion cylinder comprising:
    a body comprising an inner wall that defines a bore having a diameter D;
    a piston located in said bore and comprising opposite inner and outer faces, wherein said outer face is oriented outwardly relative to said bore and said manifold;
    a fluid seal supported on said piston and slidably engaged with said inner wall defining said bore;

first and second axially spaced-apart bearings supported on said piston and slidably engaged with said inner wall defining said bore, said first and second bearings cooperating to support said piston slidably in said bore for reciprocal sliding movement between an extended position, where said piston is located adjacent an outer end of said body, and a retracted position, where said piston is moved axially into said bore away from said outer end of said body, said bearings defining inclusively therebetween a bearing-length L that is less than or equal to 25% of said bore diameter D;

said second bearing located axially inward from said first bearing and comprising an annular disc member including a central opening defined therein;

said fluid seal located axially between said first and second bearings;

each of said cushion cylinders further comprising a bearing retainer comprising a body and a flange projecting outwardly from said body, wherein said body of said bearing retainer is received in said central opening of the second bearing and said bearing retainer is fixedly secured to said piston, and wherein said flange of said bearing retainer engages and clamps said second bearing between the flange and the piston.

4. The cushion as set forth in claim 3, wherein said piston comprises a recess defined therein, and wherein said body of said bearing retainer is received through said central opening of said second bearing with minimal radial clearance and fitted into said recess of said piston with minimal radial clearance to ensure axial alignment of said first and second bearings.

5. The cushion as set forth in claim 4, wherein said second bearing of each cushion cylinder has a radial inner portion of reduced axial thickness relative to a radial outer portion so that said second bearing defines a recess in which said flange of said bearing retainer is seated.

6. The cushion as set forth in claim 5, wherein said radial outer portion of said second bearing of each of said cushion cylinders projects radially outward from a cylindrical periphery of said piston and said flange of said bearing retainer so as to be cantilevered.

7. The cushion as set forth in claim 6, wherein a space is defined axially between said second bearing and said fluid seal in each of said cushion cylinders to prevent interference between said fluid seal and said second bearing.

8. The cushion as set forth in claim 7, wherein for each of said cushion cylinders, said piston comprises a flange projecting outwardly from said cylindrical periphery that abuts said cylinder body when said piston is located in said extended position, wherein said wiper seal and said first bearing are supported on said flange of said piston.

9. The cushion as set forth in claim 8, wherein said flange of said piston of each cushion cylinder is stepped and comprises a first step that supports said wiper seal and a second step that supports said first bearing.

10. The cushion as set forth in claim 8, wherein said first bearing of each cushion cylinder defines a groove in which said wiper seal is positioned between said first bearing and said flange of said piston.

11. A cushion cylinder for a multiple cylinder, high-pressure cushion manifold, said cushion cylinder comprising:
a body comprising an inner wall that defines a bore having a diameter D;
a piston located in said bore and comprising a cylindrical outer surface and opposite inner and outer faces, both said inner and outer faces being arranged transverse to said cylindrical outer surface, wherein said outer face is oriented outwardly relative to said bore and said manifold, and wherein said inner face defines an axially inner most face;
a fluid seal supported on said piston and slidably engaged with said inner wall defining said bore;
a bearing retainer secured to said piston;
first and second axially spaced-apart bearings supported on said piston and slidably engaged with said inner wall defining said bore, said first and second bearings cooperating to support said piston slidably in said bore for reciprocal sliding movement between an extended position, where said piston is located adjacent an outer end of said body, and a retracted position, where said piston is moved axially into said bore away from said outer end of said body, said bearings defining inclusively therebetween a bearing-length L that is less than or equal to 25% of said bore diameter D; wherein said second bearing is located axially inward from said first bearing and is secured to said piston by said bearing retainer with a first part of said second bearing held in contact with and covering at least part of said transverse inner face of said piston and a second part of said second bearing projecting outwardly beyond and cantilevered relative to said cylindrical outer surface of said piston and slidably engaged with said inner wall defining said bore such that said second bearing abuts said axially inner most face of said piston, and wherein said fluid seal is located axially between said first and second bearings.

12. The cushion cylinder as set forth in claim 11, further comprising a wiper seal located on said piston and slidably engaged with said inner wall of said body that defines said bore axially outward from said first bearing to inhibit entry of contaminants into said bore between said piston and said inner wall.

13. A cushion cylinder for a multiple cylinder, high-pressure cushion manifold, said cushion cylinder comprising:
a body comprising an inner wall that defines a bore having a diameter D;
a piston located in said bore and comprising opposite inner and outer faces, wherein said outer face is oriented outwardly relative to said bore and said manifold;
a fluid seal supported on said piston and slidably engaged with said inner wall defining said bore;
first and second axially spaced-apart bearings supported on said piston and slidably engaged with said inner wall defining said bore, said first and second bearings cooperating to support said piston slidably in said bore for reciprocal sliding movement between an extended position, where said piston is located adjacent an outer end of said body, and a retracted position, where said piston is moved axially into said bore away from said outer end of said body,
said bearings defining inclusively therebetween a bearing-length L that is less than or equal to 25% of said bore diameter D;
said second bearing located axially inward from said first bearing and comprising an annular disc member including a central opening defined therein;
said fluid seal located axially between said first and second bearings;
said cushion cylinder further comprising a bearing retainer comprising a body and a flange projecting outwardly from said body, wherein said body of said bearing retainer is received in said central opening of the second bearing and said bearing retainer is fixedly secured to said piston, and wherein said flange of said bearing retainer engages and clamps said second bearing between the flange and the piston.

14. The cushion cylinder as set forth in claim 13, wherein said piston comprises a recess defined therein, and wherein said body of said bearing retainer is received through said central opening of said second bearing with minimal radial clearance and fitted into said recess of said piston with minimal radial clearance to ensure axial alignment of said first and second bearings.

15. The cushion cylinder as set forth in claim 14, wherein said second bearing includes a first portion having a reduced axial thickness relative to a second portion, wherein said thinner portion is clamped between said flange of said bearing retainer and said thicker portion is unsupported and cantilevered relative to said piston and said bearing retainer.

16. The cushion cylinder as set forth in claim 13, wherein a portion of said second bearing projects radially outward from and is cantilevered relative to said piston and bearing retainer.

17. The cushion cylinder as set forth in claim 16, wherein a space is defined axially between said second bearing and said fluid seal to prevent interference between said fluid seal and said second bearing.

18. The cushion cylinder as set forth in claim 16, wherein said piston comprises a flange projecting outwardly from said cylindrical periphery that abuts said cylinder body when said piston is located in said extended position, and wherein said wiper seal and said first bearing are supported on said flange of said piston.

19. The cushion cylinder as set forth in claim 18, wherein said flange of said piston is stepped and comprises a first step that supports said wiper seal and a second step that supports said first bearing.

20. The cushion cylinder as set forth in claim 18, wherein said first bearing defines a groove in which said wiper seal is positioned between said first bearing and said flange of said piston.

* * * * *

UNITED STATES PATENT AND TRADEMARK OFFICE
CERTIFICATE OF CORRECTION

PATENT NO. : 7,472,897 B2  Page 1 of 1
APPLICATION NO. : 11/494079
DATED : January 6, 2009
INVENTOR(S) : Harold I. Lanterman et al.

It is certified that error appears in the above-identified patent and that said Letters Patent is hereby corrected as shown below:

Title Page

Item [75], Inventor's name should be listed as follows:

--Inventors: Harold I. Lanterman, Stow, OH (US)--

Signed and Sealed this

Twenty-first Day of April, 2009

JOHN DOLL
*Acting Director of the United States Patent and Trademark Office*